United States Patent [19]
Soulages

[11] Patent Number: 6,006,766
[45] Date of Patent: Dec. 28, 1999

[54] SEWER LINE FLUSHING SYSTEM AND METHOD

[76] Inventor: Gary Soulages, 1826 Clinton Ave., Alameda, Calif. 94501

[21] Appl. No.: 09/032,927

[22] Filed: Mar. 2, 1998

[51] Int. Cl.$^6$ ........................................................ B08B 9/02
[52] U.S. Cl. ...................... 134/166 C; 4/323; 134/166 R
[58] Field of Search ........................... 134/166 R, 166 C, 134/169 R, 169 C; 4/321, 322, 323

[56] References Cited

U.S. PATENT DOCUMENTS

| | | | |
|---|---|---|---|
| 3,811,462 | 5/1974 | Feliz | 137/344 |
| 4,387,750 | 6/1983 | McNerney | 141/331 |
| 4,550,453 | 11/1985 | Norman | 134/166 R X |
| 4,938,241 | 7/1990 | Teel | 134/104.2 |
| 5,056,544 | 10/1991 | Stevens | 134/166 R |

*Primary Examiner*—Philip R. Coe

[57] ABSTRACT

This invention relates to an improved sewer system for recreational vehicles. Specifically, a four way pipe connector is provided which resides below a flushing tank and connects the flushing tank, the gray water waste tank, the black water waste tank and the dump hose. Valves selectively open and close access to the four way pipe connector. The flushing tank includes five gallons of water which are selectively flushed through the dump hose to remove any waste residue that remains after draining the black or gray water waste tanks.

17 Claims, 4 Drawing Sheets

SEWER LINE FLUSHING SYSTEM AND METHOD

BACKGROUND OF THE INVENTION

1. Field of the Invention

This invention pertains to a device and method for conveniently flushing a sewer dump hose on a recreational vehicle.

2. Description of The Prior Art and Objectives of the invention

It is common in the recreational vehicle industry to provide a sewer system dump hose which is in fluid communication with both the black water waste tank and the gray water waste tank. With this arrangement, recreational vehicle users may drain waste from their recreational vehicles usually by first draining the black water, then draining the gray water. The unfortunate byproduct of this process is that the dump hose becomes fouled with residue from both the black water waste and the gray water waste. The typical approach to removing this residue consists of inserting a conventional garden hose or the like into the dump hose and spraying or rinsing the dump hose. This procedure is not always satisfactory and generally fouls the exterior surface of the garden hose, and is thus undesirable.

Another approach is to rinse the waste tank and allow the rinsing agent to drain through the hose. This is also somewhat undesirable because it requires a large volume of water or other rinsing agent to completely clean the waste tank. Even then, the fouled water continues to contaminate the dump hose, so more water or rinsing agent must be used to rinse the dump hose, and since the water does not flow in great quantities, the "upper" interior hose surfaces may not be completely rinsed.

With the above limitations in mind, it is an objective of the present invention to provide a simple mechanism to adequately flush the dump hose of a recreational vehicle sewer system.

It is a further objective of the present invention to provide a flushing tank for rapidly delivering a relatively large quantity of water through the dump hose at the same time so as to flush the entire diameter thereof for conservation and sanitary purposes.

It is still a further objective of the present invention to provide a four way valve which connects the gray water waste tank, the black water waste tank, a flushing tank and the sewer dump hose.

It is yet a further objective of the present invention to provide valves for manually, selectively opening and closing the four way valve.

It is another objective to provide an improvement to the waste system of a recreational vehicle which is easily adapted to a recreational vehicle's interior.

It is still another objective to provide a convenient method of flushing a dump hose on a recreational vehicle through the use of a flushing tank containing water.

It is yet another objective to provide a dump hose which does not have to be removed from the recreational vehicle to be cleaned.

SUMMARY OF THE INVENTION

This invention pertains to a flushing system which is well suited for rinsing a recreational vehicle's sewer system. Specifically, a flushing tank is provided which is positioned above a manual, valved, four way, multiple pipe connector. The multiple pipe connector is in fluid communication with the black water waste tank, the gray water waste tank, a water flushing tank and the sewer dump hose. The flushing tank is preferably a five gallon capacity plastic tank with an inlet pipe which allows the tank to be refilled after the flushing process. The tank may be filled with any liquid or rinsing agent such as water or a chemical cleaner. Valves selectively open and close the pipes from the black water waste tank, the gray water waste tank, and the flushing tank. The four way pipe connector can be metal or polymeric, but is preferably polymeric to prevent corrosion and rust.

A method of flushing the recreational vehicle's sewer system is also provided which uses the above-described structure as follows. Initially all valves are closed on the four way pipe connector. The sewer dump hose is joined to a conventional exterior sewer connection or septic tank stub such as commonly found at recreational vehicle camp grounds. The user then drains the black water waste tank by opening the black water tank valve on the four way pipe connector, thereby allowing the black water waste to flow out the dump hose. The user then closes the black water waste valve and opens the gray water waste valve, also on the four way pipe connector, thereby draining the gray water waste tank similarly through the dump hose. Finally the user opens the flushing tank valve and the five gallons of water contained in the flushing tank flush through the four way valve connector and out the dump hose, thereby rinsing and flushing the same in a complete and easy manner, and precluding the need to remove the dump hose from the recreational vehicle to clean the dump hose as with most conventional dump hoses.

DETAILED DESCRIPTION OF THE PREFERRED EMBODIMENT AND OPERATION OF THE INVENTION

Figure 1:
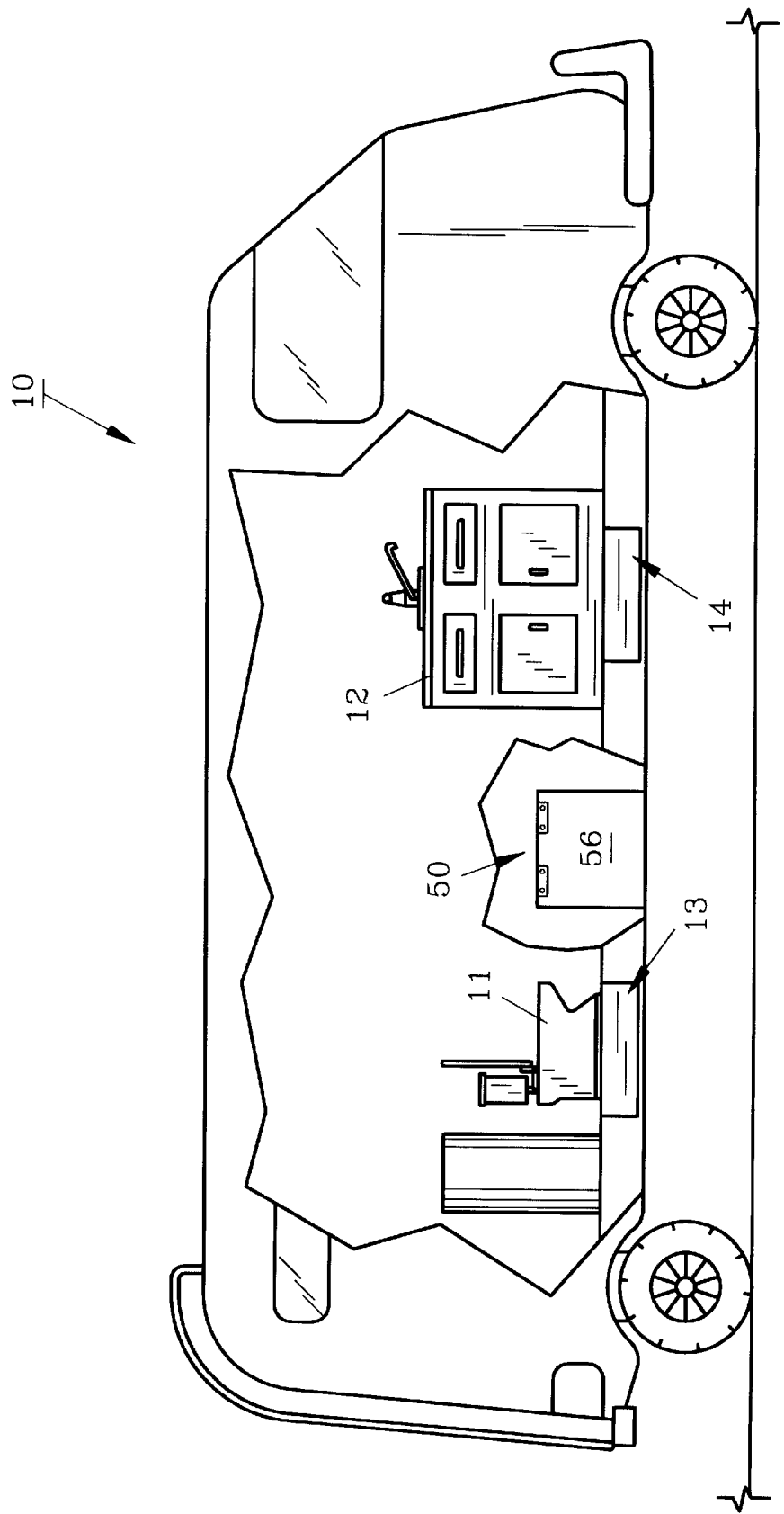
FIG. 1 shows a typical recreational vehicle with a sewer system therein in partial cutaway view to expose the same.
Figure 2:
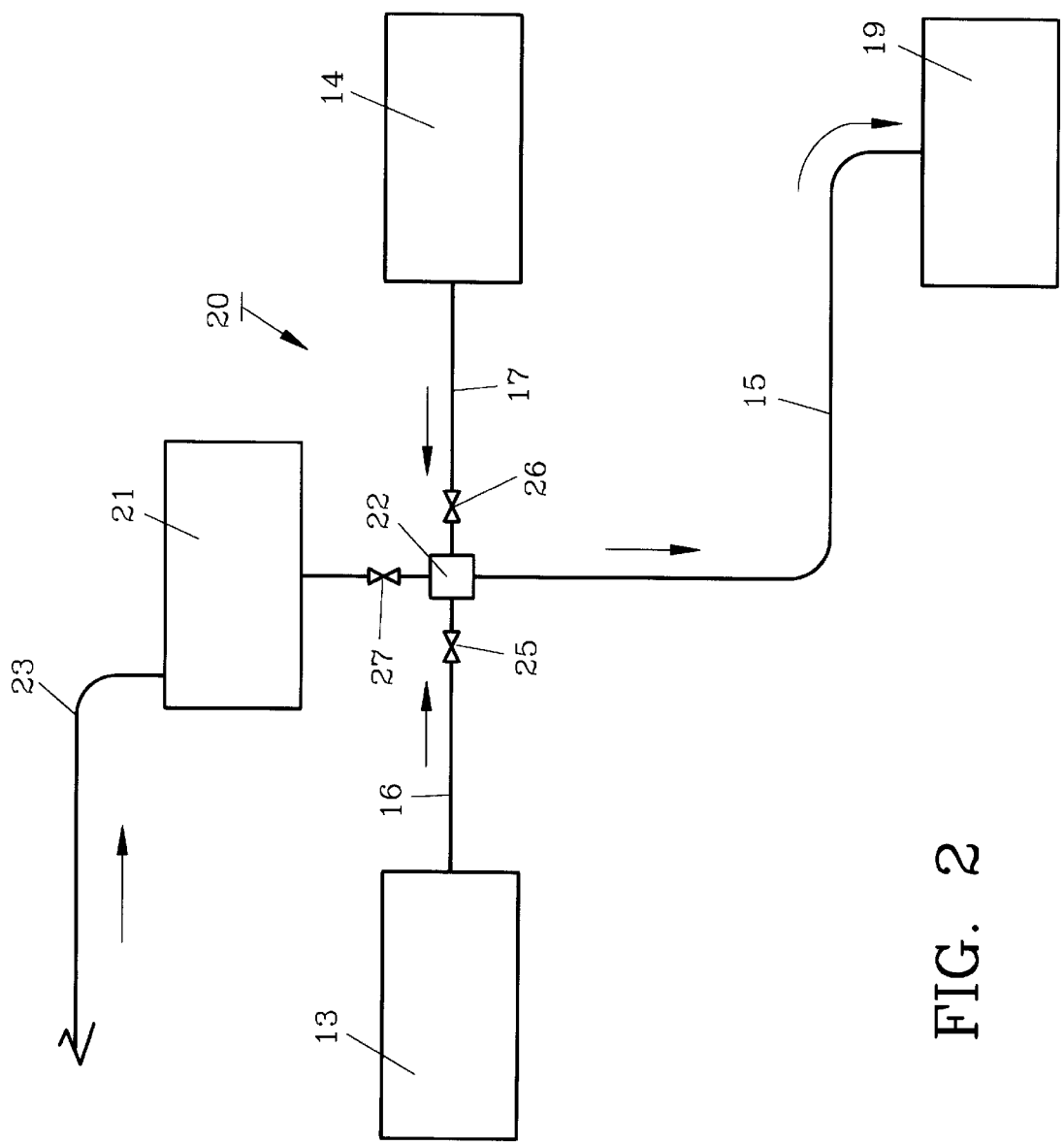
FIG. 2 illustrates a schematic recreational vehicle sewer system.

Turning now to the drawings, specifically FIG. 1 illustrates typical recreational vehicle 10 which includes toilet 11 and sink 12. Toilet 11 drains into black water waste tank 13 while sink 12 and shower (not shown) drain into gray water waste tank 14. In normal operation waste tanks 13 and 14 hold all waste coming from the respective facilities, however as seen in the schematic of FIG. 2, at campgrounds and the like, conventional sewer disposal site 19 provides the opportunity to empty waste tanks 13 and 14 through conventional dump hose 15. Also seen is cabinet 50, located behind door 56 which is discussed further below.

Figure 3:
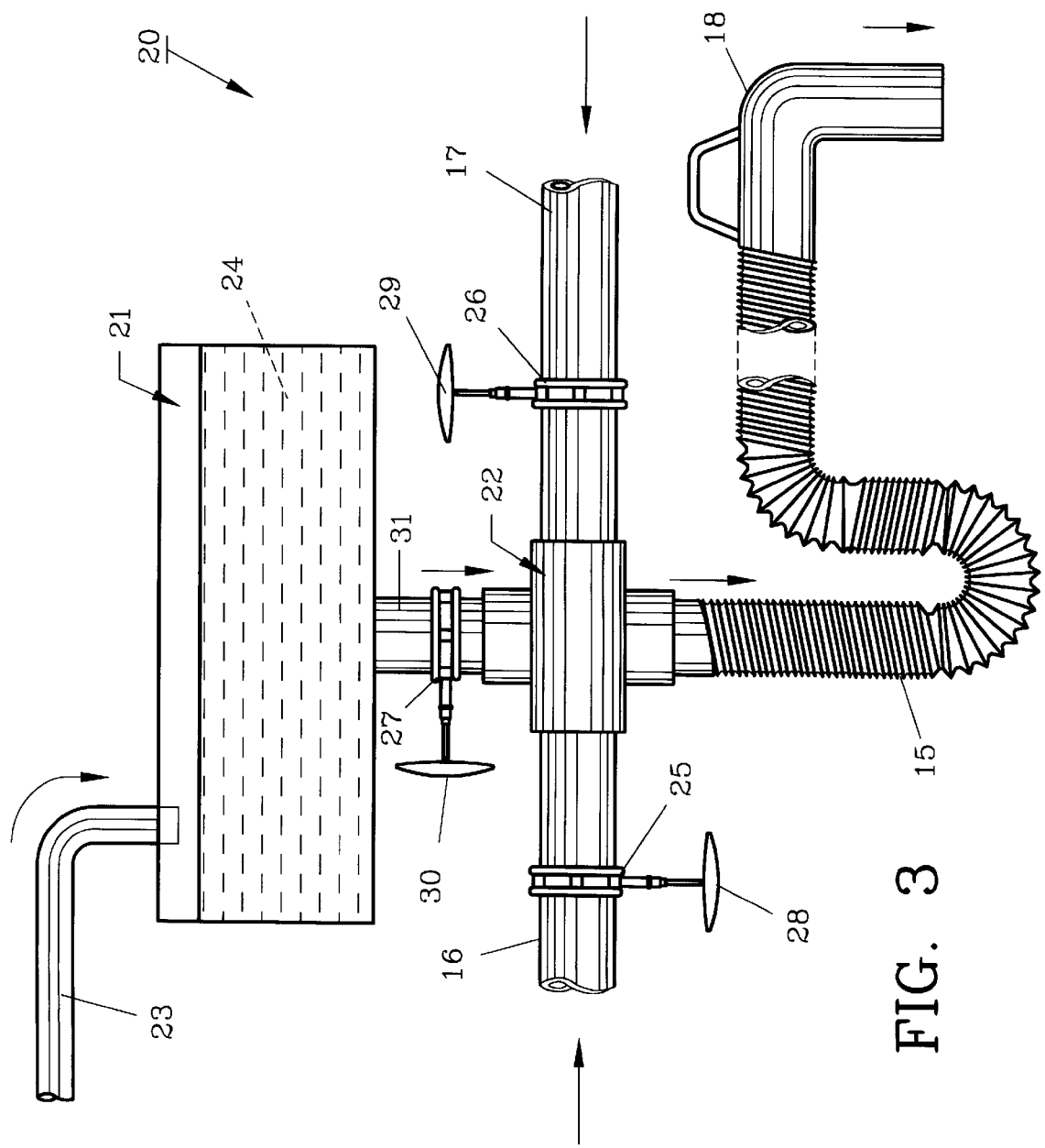
FIG. 3 demonstrates a front elevational view of the improvement of the present invention.

As seen in FIGS. 2 and 3 sewer flushing system improvement 20 which comprises flushing tank 21 is placed superiorly of multiple pipe connector 22. Flushing tank 21 is preferably a plastic five gallon tank with inlet pipe 23. Flushing tank 21 is preferably filled with liquid 24 such as water or another appropriate rinsing agent. Flushing tank 21 is in fluid communication with multiple pipe connector 22, which is preferably a four way pipe connector, also made of plastic, although metal could be used if made with suitable corrosion resistance properties as seen in FIG. 3, flushing tank 21 is joined to valve 30 by flush tank drain line 31. Multiple pipe connector 22 is in fluid communication with black water waste tank 13 and gray water waste tank 14 via conventional piping 16 and 17 respectively. Multiple pipe connector 22 is also in fluid communication with sewer dump hose 15. Dump hose 15 is preferably a flexible, corrugated sewer dump hose such as standard in the recreational vehicle industry, and may be connected to conventional elbow connector 18, thence to standard sewer facility 19 (FIG. 2).

Multiple pipe connector 22 is preferably integrally formed and includes three conventional manual gate valves, which are not integral to the extent that they have moving parts. Black water waste valve 25 selectively opens and closes pipe 16 from black water waste tank 13. Gray water waste valve 26 selectively opens and closes pipe 17 from gray water waste tank 14. Flushing tank valve 27 selectively opens and closes the fluid communication between flushing tank 21 and multiple pipe connector 22. Valves 25–27 are all conventional gate valves and are slidably actuated by manipulation of handles 28–30 respectively. As is conventional, when handles 28–30 are pushed inwardly, valves 25–27 close and when handles 28–30 are pulled outwardly valves 25–27 open and allow fluid to pass therethrough. As should be understood, opening of any of valves 25–27 empties corresponding tanks 13, 14 or 21, and allows any fluid therein to drain through multiple pipe connector 22 and out dump hose 15.

The preferred method of using the sewer line flushing system of the present invention comprises closing all valves 25–27 and securely positioning dump hose 15 in sewer facility 19. The user (not shown) then opens black water waste valve 25 by pulling handle 28. This drains black water waste tank 13 through dump hose 15. The user then closes black water waste valve 25 by pushing handle 28 inwardly. Gray water waste valve 26 is then opened by pulling handle 29. This drains gray water waste tank 14 in the same manner as described with black water tank 13. The user then closes gray water waste valve 26 by pushing handle 29 inwardly. Now both waste tanks are empty, but dump hose 15 has been fouled by the residue of waste passing therethrough. In order to clean dump hose 15, the user verifies, such as by visual observation, that flushing tank 21 is full of liquid 24 such as water and then opens flushing tank valve 27 by pulling handle 30 outwardly. This causes a large volume (preferably five gallons) of liquid to travel rapidly through multiple pipe connector 21 and out dump hose 15. The large liquid volume inherently creates a fair amount of pressure in dump hose 15, which is typically three inches in diameter. This pressure (and volume of liquid 24) effectively fills and flushes dump hose 15, thereby removing any waste residue therefrom. Flushing tank valve 27 is then closed by pushing handle 30 inwardly, and the user is free to coil and store clean dump hose 15 as is conventional. Flushing tank 21 is then refilled as desired. It should be understood that preferably this process is completed just prior to leaving the recreational vehicle campsite.

Figure 4:
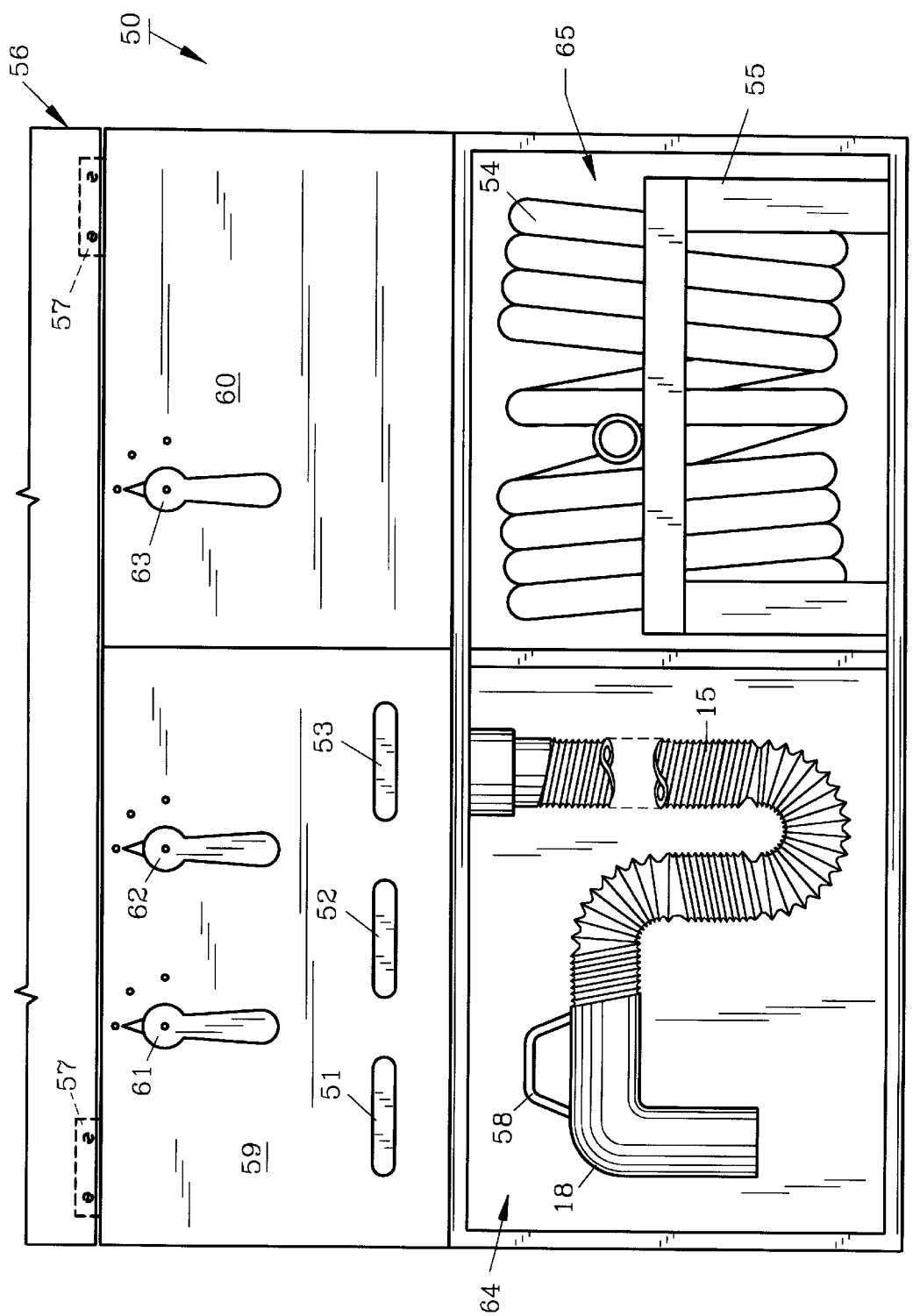
FIG. 4 represents a possible control panel which operates the present invention.

FIG. 4 depicts a convenient arrangement for the above recited features. Specifically shown is cabinet 50 which includes door 56 (shown partially, in a raised position) attached to recreational vehicle 10 (FIG. 1) by hinges 57. Inside cabinet 50, on panel 59, are handles 51–53 which are mechanically connected to handles 28–30 respectively and upon manipulation of handles 51–53 the corresponding handle 28–30 is opened or closed as desired and as would be well understood. It should be understood that handles 51–53 are arbitrarily positioned, and any physical location rearrangement of handles 51–53 is possible. Thus, from left to right the handles could empty gray-flushing-black; black-flushing-gray; flushing-black-gray or any combination of the three rather than the gray-black-flushing shown in FIG. 4. Dump hose 15 is stored in recess 64, which is large enough to receive entire hose 15 and elbow 18. Handle 58 may be conveniently used to pull hose 15 from recess 64 for use or to return hose 15 to recess 64 for travel. In recess 65, proximate hose 15, is garden hose 54, which rests on conventional reel 55. Conventional reel 55 allows garden hose 54 to be conveniently wound and unwound as desired by a user. On panels 59 and 60 above the two recesses 64 and 65 are switches 61–63. Switch 61 is preferably a switch which controls a set of black water flushing jets (not shown) as conventional in the industry. It is also possible to have a set of similar flushing jets in the gray water tank, and these too may be controlled by switch 61, although a three way switch would be required with position 1 turning on the black water flushing jets, position 2 being an off position, and position 3 turning on the gray water flushing jets. These flushing jets could be used prior to emptying gray water tank 14 in the process, and rinses and flushes black water tank 13. Switch 62 operates inlet pipe 23 and allows flushing tank 21 to be refilled as is conventional either from an exterior line or an interior reservoir. Switch 63 controls the fresh drinking water source, namely it switches between an exterior line and the interior reservoir (neither shown) as is conventional. Cabinet 50 thus provides a convenient arrangement of multiple water controls in one location while at the same time providing a storage space for dump hose 15 and garden hose 54. Additional switches and handles may be provided to control other reservoirs or valves in the recreational vehicle as needed.

The preceding recitation is provided as an example of the preferred embodiment and is not meant to limit the nature of scope of the present invention or appended claims.

I claim:

1. In a recreational vehicle sewer system, having a black water waste line, a gray water waste line and a dump hose, the improvement comprising:

a) a multiple pipe connector, said multiple pipe connector joined to said black water waste line, said gray water waste line and said dump hose;

b) a flushing tank, said flushing tank joined to said multiple pipe connector in axial alignment with said dump hose; and c) a liquid, said liquid contained in said flushing tank, wherein said liquid may be selectively released from said flushing tank through said multiple pipe connector to thereby rinse and flush said dump hose.

2. The recreational vehicle sewer system of claim 1 wherein said flushing tank is positioned above said multiple pipe connector.

3. The recreational vehicle sewer system of claim 1 wherein said liquid is water.

4. The recreational vehicle sewer system of claim 1 wherein said flushing tank has a five gallon capacity.

5. The recreational vehicle sewer system of claim 1 further comprising a valve, said valve contiguous to said multiple pipe connector.

6. The recreational vehicle sewer system of claim 5 wherein said valve selectively closes said black water waste line.

7. The recreational vehicle sewer system of claim 5 wherein said valve selectively closes said gray water waste line.

8. The recreational vehicle sewer system of claim 5 wherein said valve selectively closes said flushing tank.

9. The recreational vehicle sewer system of claim 1 further comprising an inlet pipe, said inlet pipe in fluid communication with said flushing tank, said inlet pipe adapted to refill said flushing tank.

10. A sewer line flushing system adapted for use in a recreational vehicle comprising:
   a) a multiple pipe connector;
   b) a dump hose, said dump hose in fluid communication with said multiple pipe connector;
   c) a flushing tank, said flushing tank in fluid communication with said multiple pipe connector in axial alignment with said dump hose; and
   d) a quantity of liquid, said liquid contained in said flushing tank and selectively releasable through said multiple pipe connector to rinse and flush said dump hose.

11. The flushing system of claim 10 wherein said flushing tank is positioned above said multiple pipe connector.

12. The flushing system of claim 10 wherein said liquid is a rinsing agent.

13. The flushing system of claim 10 wherein said flushing tank has a five gallon capacity.

14. The flushing system of claim 10 further comprising a valve, said valve contiguous to said multiple pipe connector.

15. The flushing system of claim 10 wherein said multiple pipe connector is a four way pipe connector.

16. The recreational vehicle sewer system of recreational vehicle sewer system of claim 1 further comprising a flush tank drain line, said flush tank drain line and said dump hose having the same diameter.

17. The sewer line flushing system of claim 10 further comprising a flush tank drain line, said flush tank drain line and said dump hose having the same diameter.

\* \* \* \* \*